United States Patent
Liu et al.

(10) Patent No.: US 10,148,935 B2
(45) Date of Patent: Dec. 4, 2018

(54) DEPTH PICTURE INTER ENCODING AND DECODING METHOD, ENCODER AND DECODER

(71) Applicant: LG Electronics (China) R&D Center Co., Ltd., Beijing (CN)

(72) Inventors: Hongbin Liu, Beijing (CN); Jie Jia, Beijing (CN)

(73) Assignee: LG Electronics (China) R&D Center Co., Ltd., Beijing (CN)

( * ) Notice: Subject to any disclaimer, the term of this patent is extended or adjusted under 35 U.S.C. 154(b) by 238 days.

(21) Appl. No.: 14/783,720

(22) PCT Filed: Mar. 27, 2014

(86) PCT No.: PCT/CN2014/074220
§ 371 (c)(1),
(2) Date: Oct. 9, 2015

(87) PCT Pub. No.: WO2014/166340
PCT Pub. Date: Oct. 16, 2014

(65) Prior Publication Data
US 2016/0073082 A1 Mar. 10, 2016

(30) Foreign Application Priority Data

Apr. 9, 2013 (CN) .......................... 2013 1 0120490
Jul. 4, 2013 (CN) .......................... 2013 1 0279261

(51) Int. Cl.
*H04N 13/00* (2018.01)
*H04N 13/161* (2018.01)
(Continued)

(52) U.S. Cl.
CPC ......... *H04N 13/161* (2018.05); *H04N 19/105* (2014.11); *H04N 19/109* (2014.11);
(Continued)

(58) Field of Classification Search
None
See application file for complete search history.

(56) References Cited

U.S. PATENT DOCUMENTS

2003/0202594 A1* 10/2003 Lainema ............. H04N 19/176
375/240.16
2012/0183066 A1 7/2012 Oh et al.
(Continued)

FOREIGN PATENT DOCUMENTS

CN 102017627 4/2011
CN 102752595 10/2012
(Continued)

OTHER PUBLICATIONS

Early Determination of Mode Decision for HEVC, 2012 Picture Coding Symposium, May 7-9, 2012, Krakow, Poland.*
(Continued)

*Primary Examiner* — Janese Duley
(74) *Attorney, Agent, or Firm* — Hanley, Flight & Zimmerman, LLC

(57) ABSTRACT

A depth picture inter encoding method, a decoding method, an encoder and a decoder, wherein the depth picture inter encoding method comprises: judging whether a depth picture inter encoding mode is a skip mode; setting a first depth picture inter encoding flag bit to an encoding unit if it is judged that the depth picture inter encoding mode is not the skip mode; judging whether the first depth picture inter encoding flag bit is true, encoding merely one residual value to each prediction unit if it is judged that the first depth picture inter encoding flag bit is true. Encoding by adopting a residual encoding manner existing in 3D-HEVC if it is judged that the first depth picture inter encoding flag bit is false.

8 Claims, 9 Drawing Sheets

(51) Int. Cl.
 *H04N 19/109* (2014.01)
 *H04N 19/463* (2014.01)
 *H04N 19/105* (2014.01)
 *H04N 19/147* (2014.01)
 *H04N 19/176* (2014.01)
 *H04N 19/44* (2014.01)

(52) U.S. Cl.
 CPC ......... *H04N 19/147* (2014.11); *H04N 19/176* (2014.11); *H04N 19/44* (2014.11); *H04N 19/463* (2014.11)

(56) References Cited

U.S. PATENT DOCUMENTS

2014/0301454 A1* 10/2014 Zhang ............... H04N 13/0048
 375/240.12
2015/0208092 A1* 7/2015 Lee ..................... H04N 19/105
 375/240.12

FOREIGN PATENT DOCUMENTS

| | | |
|---|---|---|
| CN | 102790892 | 11/2012 |
| CN | 102792695 | 11/2012 |
| CN | 103155563 | 6/2013 |
| WO | 2013060471 | 5/2013 |

OTHER PUBLICATIONS

Non-CE: Simplified Inter mode Coding of Depth, Joint Collaborative Team on 3D Video Coding Extension Development of ITU-T SG 16 WP 3 and ISO/IEC JTC 1/SC 29/WG 11, JCT3V-D0069, Liu et al., Apr. 20-26, 2013 (Year: 2013).*

International Searching Authority, "International Search Report", issued in connection with International Patent Application No. PCT/CN2014/074220, dated May 12, 2014 (2 pages).

The State Intellectual Property Office of China, "First Office Action and Search Report," mailed in connection with Chinese Patent Application No. 201310279261.7, dated Jan. 17, 2018, 9 pages.

* cited by examiner

Prior Art

DEPTH PICTURE INTER ENCODING AND DECODING METHOD, ENCODER AND DECODER

The present application claims priorities of a Chinese patent application entitled "Depth Picture Inter Encoding and Decoding Method, Encoder and Decoder" filed on Apr. 9, 2013 with application number 201310120490.4 and a Chinese patent application entitled "Depth Picture Inter Encoding and Decoding Method, Encoder and Decoder" filed on Jul. 4, 2013 with application number 201310279261.7, of which all contents are incorporated by reference into the present application.

FIELD OF INVENTION

The invention relates to technical field of encoding and decoding, and particularly relates to a depth picture inter encoding and decoding method, an encoder and a decoder.

BACKGROUND OF THE INVENTION

In 3D High Efficiency Video Coding (hereinafter, 3D-HEVC), inter mode depth encoding units can be divided in manners such as 2N×2N, 2N×N, 2N×nU, 2N×nD, N×2N, nL×2N, nR×2N and N×N and so on. FIG. 9 is a schematic of dividing manners of the inter mode depth encoding units in 3D-HEVC. Wherein, N is one of 4, 8, 16 and 32; n=N/2, U means up, D means down; L means left, and R means right. When a residual of a depth encoding unit is encoded, operations such as transformation, quantization and the like are needed to be conducted to residual signals as to all dividing manners; and operations such as corresponding inverse quantization, inverse transformation and the like are needed to be conducted in decoding.

Therefore it is urgent for those skilled in the art to solve problem of low efficiency caused by complicated processing in depth picture inter encoding and decoding.

SUMMARY OF THE INVENTION

The invention is aimed to provide a depth picture inter encoding and decoding method, an encoder and a decoder directed to the above problem, to improve encoding and decoding efficiency.

To realize the above object, the invention provides a depth picture inter encoding method, which comprises:

judging whether a depth picture inter encoding mode is a skip mode; setting a first depth picture inter encoding flag bit to an encoding unit if it is judged that the depth picture inter encoding mode is not the skip mode;

judging whether the first depth picture inter encoding flag bit is true; encoding merely one residual value to each prediction unit if it is judged that the first depth picture inter encoding flag bit is true.

To realize the above object, the invention provides a depth picture inter decoding method, which comprises:

judging whether a depth picture inter encoding mode is a skip mode; decoding the encoding unit to acquire a first depth picture inter encoding flag bit if it is judged that the depth picture inter encoding mode is not the skip mode;

judging whether the first depth picture inter encoding flag bit is true; decoding merely one residual value to each prediction unit and calculating a reconstruction value of each prediction unit if it is judged that the first depth picture inter encoding flag bit is true.

Correspondingly, to achieve the above object, the invention further provides a decoder, comprising:

a processor, configured to:

judge whether a depth picture inter encoding mode is a skip mode; decode the encoding unit to acquire a first depth picture inter encoding flag bit if it is judged that the depth picture inter encoding mode is not the skip mode;

judge whether the first depth picture inter encoding flag bit is true; decode merely one residual value to each prediction unit and calculate a reconstruction value of each prediction unit if it is judged that the first depth picture inter encoding flag bit is true.

To realize the above object, the invention provides another depth picture inter decoding method, which comprises:

decoding an encoding area to acquire a depth inter encoding flag bit of the encoding area;

judging whether the depth inter encoding flag bit is true, and judging whether a depth picture inter encoding mode is a skip mode if it is judged that the depth inter encoding flag bit is true; decoding the encoding unit to acquire a first depth picture inter encoding flag bit if it is judged that the depth picture inter encoding mode is not the skip mode;

judging whether the first depth picture inter encoding flag bit is true; decoding merely one residual value to each prediction unit and calculating a reconstruction value of each prediction unit if it is judged that the first depth picture inter encoding flag bit is true.

The above technical solution has the following beneficial effects: by adopting the technical solution, overlap of "the method for encoding merely one residual to each prediction unit" and the mode of skip in 3D-HEVC, so as to further reduce code rate, and save transformation operation, reduce complexity of an encoder and a decoder, thereby improving efficiency.

BRIEF DESCRIPTION OF THE DRAWINGS

In order to describe the embodiment of the invention or technical solutions in prior art more clearly, hereinafter accompanying figures required to be used in description of the embodiment or the prior art will be introduced briefly. Obviously, the accompanying figures in the following description are merely some embodiments of the invention, and it is practicable for those skilled in the art to obtain other accompanying figures according to these ones in the premise of making no creative efforts.

DETAILED DESCRIPTION OF THE EMBODIMENTS

Hereinafter technical solutions in the embodiments of the invention will be described clearly and completely incorporating accompanying figures in the embodiment of the invention. Obviously, the described embodiments are merely part of embodiments of the invention, but not all of the embodiments. On the basis of the embodiment in the invention, all of the other embodiments obtained by those skilled in the art in the premise that no creative efforts are made fall within the protection scope of the invention.

Figure 1:
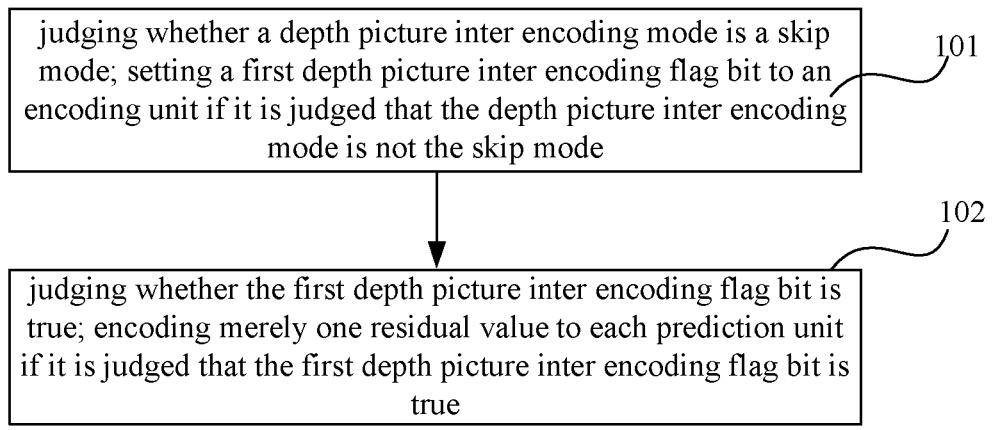
FIG. 1 is a first flowchart of a depth picture inter encoding method according to an embodiment of the invention.

FIG. 1 is a first flowchart of the depth picture inter encoding method according to an embodiment of the invention; the depth picture inter encoding method comprises:

step 101: judging whether a depth picture inter encoding mode is a skip mode; setting a first depth picture inter encoding flag bit to an encoding unit if it is judged that the depth picture inter encoding mode is not the skip mode;

step 102: judging whether the first depth picture inter encoding flag bit is true; encoding merely one residual value to each prediction unit if it is judged that the first depth picture inter encoding flag bit is true.

Particularly, the depth picture inter encoding method further comprises: encoding by adopting a residual encoding manner existing in 3D-HEVC if it is judged that the first depth picture inter encoding flag bit is false.

Particularly, the step of setting the first depth picture inter encoding flag bit to an encoding unit comprise:

acquiring or calculating rate distortion cost of the residual encoding manner existing in 3D-HEVC;

acquiring or calculating rate distortion cost by which merely one residual value is encoded to each prediction unit;

setting the first depth picture inter encoding flag bit by comparing the rate distortion cost of the residual encoding manner existing in 3D-HEVC with the rate distortion cost by which merely one residual value is encoded to each prediction unit.

Particularly, the step of setting the first depth picture inter encoding flag bit to an encoding unit comprise:

acquiring or calculating rate distortion cost of the residual encoding manner existing in 3D-HEVC;

acquiring or calculating rate distortion cost by which merely one residual value is encoded to each prediction unit;

judging whether at least one of the residual values of the prediction unit in the encoding unit is zero; setting the first depth picture inter encoding flag bit to be false if the above judgment is true; otherwise, setting the first depth picture inter encoding flag bit by comparing the rate distortion cost of the residual encoding manner existing in 3D-HEVC with the rate distortion cost by which merely one residual value is encoded to each prediction unit.

Particularly, the step of setting the first depth picture inter encoding flag bit by comparing the rate distortion cost of the residual encoding manner existing in 3D-HEVC with the rate distortion cost by which merely one residual value is encoded to each prediction unit comprises:

setting the first depth picture inter encoding flag bit to be true if the rate distortion cost of the residual encoding manner existing in the 3D-HEVC is higher than the rate distortion cost by which merely one residual value is encoded to each prediction unit; otherwise, setting the first depth picture inter encoding flag bit to be false.

Particularly, the step of encoding merely one residual value to each prediction unit comprises:

If it is judged that dividing manner of the encoding unit is 2N×2N, the encoding unit only includes one prediction unit and only encodes 1 residual value; wherein, N is one of 4, 8, 16, 32; or if it is judged that dividing manner of the encoding unit is 2N×N, 2N×nU or 2N×nD, the encoding unit only includes an up and a down prediction units, wherein, n=N/2, U means up, D means down; or if it is judged that dividing manner of the encoding unit is N×2N, nL×2N or nR×2N, the encoding unit only includes a left and a right prediction units and correspondingly encodes two residual values; wherein, n=N/2, L means left, R means right; or if it is judged that dividing manner of the encoding unit is N×N, the encoding unit includes four prediction units and correspondingly encodes four residual values.

Particularly, method for generating the residual value comprises: the residual value=a mean value of all pixels in the current prediction unit−a mean value of all pixels in a prediction block of the current prediction unit.

Figure 2:
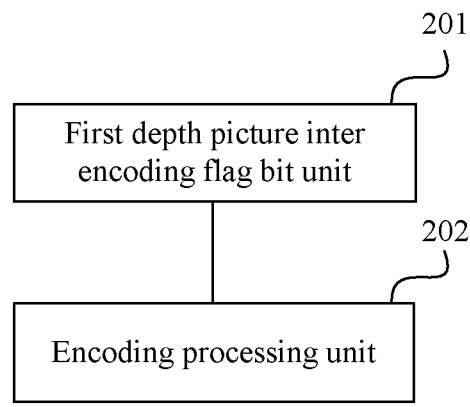
FIG. 2 is a first structure diagram of an encoder according to an embodiment of the invention.

FIG. 2 is a first structure diagram of an encoder according to an embodiment of the invention; comprising:

a first depth picture inter encoding flag bit unit 201, adapted to judge whether a depth picture inter encoding mode is a skip mode; set a first depth picture inter encoding flag bit to an encoding unit if it is judged that the depth picture inter encoding mode is not the skip mode;

a encoding processing unit 202, adapted to judge whether the first depth picture inter encoding flag bit is true; encode merely one residual value to each prediction unit if it is judged that the first depth picture inter encoding flag bit is true.

Particularly, the encoding processing unit 202 is further adapted to encode the residual value by adopting a residual encoding manner existing in 3D-HEVC if it is judged that the first depth picture inter encoding flag bit is false.

Particularly, the first depth picture inter encoding flag bit unit 201 comprises:

a first rate distortion cost module, adapted to acquire or calculate rate distortion cost of the residual encoding manner existing in 3D-HEVC;

a second rate distortion cost module, adapted to acquire or calculate rate distortion cost by which merely one residual value is encoded to each prediction unit;

a judgment and comparison module, adapted to set the first depth picture inter encoding flag bit by comparing the rate distortion cost of the residual encoding manner existing in 3D-HEVC with the rate distortion cost by which merely one residual value is encoded to each prediction unit.

Particularly, the first depth picture inter encoding flag bit unit 201 comprises:

a first rate distortion cost module, adapted to acquire or calculate rate distortion cost of the residual encoding manner existing in 3D-HEVC;

a second rate distortion cost module, adapted to acquire or calculate rate distortion cost by which merely one residual value is encoded to each prediction unit;

a judgment and comparison module, adapted to judge whether at least one of the residual values of the prediction unit is zero; set the first depth picture inter encoding flag bit to be false if the above judgment is true; otherwise, set the first depth picture inter encoding flag bit by comparing the rate distortion cost of the residual encoding manner existing in 3D-HEVC with the rate distortion cost by which merely one residual value is encoded to each prediction unit.

Particularly, the judgment and comparison module is specifically adapted to set the first depth picture inter encoding flag bit to be true if the rate distortion cost of the residual encoding manner existing in the 3D-HEVC is higher than the rate distortion cost by which merely one residual value is encoded to each prediction unit; otherwise, set the first depth picture inter encoding flag bit to be false.

Particularly, the encoding processing unit 202 is further adapted to:

If it is judged that dividing manner of the encoding unit is 2N×2N, the encoding unit only includes one prediction unit and only encodes 1 residual value; wherein, N is one of 4, 8, 16, 32; or if it is judged that dividing manner of the encoding unit is 2N×N, 2N×nU or 2N×nD, the encoding unit only includes an up and a down prediction units, wherein, n=N/2, U means up, D means down; or if it judged that dividing manner of the encoding unit is N×2N, nL×2N or nR×2N, the encoding unit only includes a left and a right prediction units and correspondingly encodes two residual values, wherein, n=N/2, L means left, R means right; or if it is judged that dividing manner of the encoding unit is N×N, the encoding unit includes four prediction units and correspondingly encodes four residual values.

Particularly, the encoding processing unit is further adapted to generate the residual value according to the following method: the residual value=a mean value of all pixels in the current prediction unit—a mean value of all pixels in a prediction block of the current prediction unit.

Figure 3:
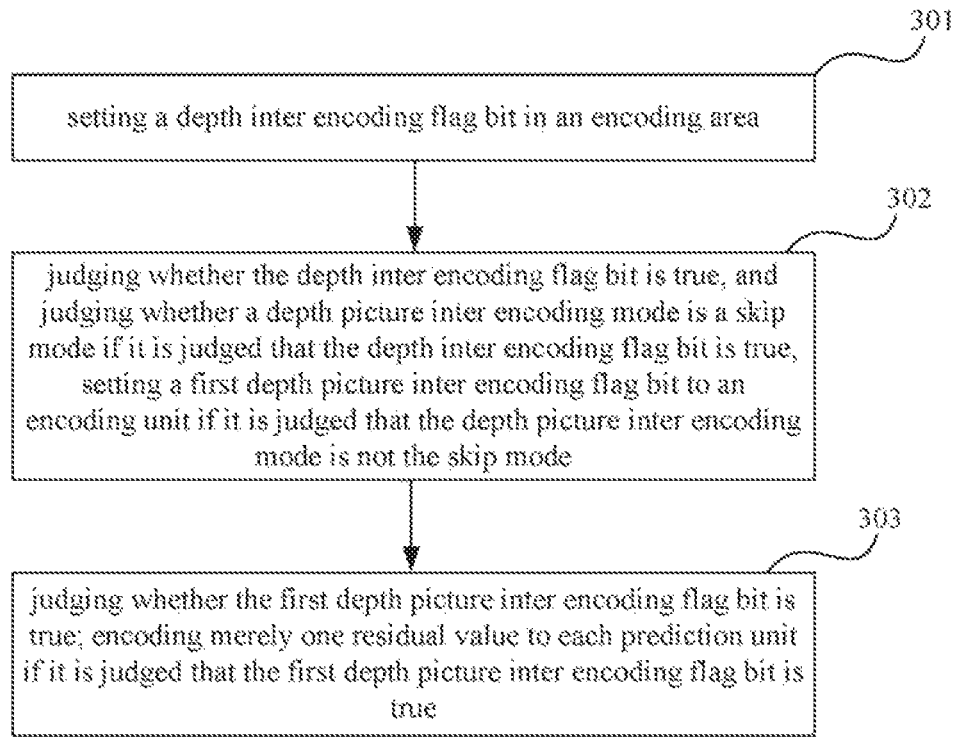
FIG. 3 is a second flowchart of the depth picture inter encoding method according to an embodiment of the invention.

FIG. 3 is a second flowchart of the depth picture inter encoding method according to an embodiment of the invention, comprising:

step 301: setting a depth inter encoding flag bit in an encoding area;

step 302: judging whether the depth inter encoding flag bit is true, and judging whether a depth picture inter encoding mode is a skip mode if it is judged that the depth inter encoding flag bit is true; setting a first depth picture inter encoding flag bit to an encoding unit if it is judged that the depth picture inter encoding mode is not the skip mode;

step 303: judging whether the first depth picture inter encoding flag bit is true; encoding merely one residual value to each prediction unit if it is judged that the first depth picture inter encoding flag bit is true.

Particularly, the depth picture inter encoding method further comprises: encoding by adopting a residual encoding manner existing in 3D-HEVC so that the first depth picture inter encoding flag bit to the encoding unit is not set if it is judged that the depth inter encoding flag bit is false.

Particularly, the encoding area is an entire sequence, at least one group of pictures, at least one picture or at least one strip.

Particularly, the depth inter encoding flag bit is set in at least one of a sequence parameter set, a video parameter set, an picture parameter set and a strip head parameter set.

Particularly, the step of encoding merely one residual value to each prediction unit comprises:

If it is judged that dividing manner of the encoding unit is 2N×2N, the encoding unit only includes one prediction unit and only encodes 1 residual value; wherein, N is one of 4, 8, 16, 32; or if it is judged that dividing manner of the encoding unit is 2N×N, 2N×nU or 2N×nD, the encoding unit only includes an up and a down prediction units, wherein, n=N/2, U means up, D means down; or if it is judged that dividing manner of the encoding unit is N×2N, nL×2N or nR×2N, the encoding unit only includes a left and a right prediction units and correspondingly encodes two residual values, wherein, n=N/2, L means left, R means right; or if it is judged that dividing manner of the encoding unit is N×N, the encoding unit includes four prediction units and correspondingly encodes four residual values.

Particularly, method for generating the residual value comprises: the residual value=a mean value of all pixels in the current prediction unit−a mean value of all pixels in a prediction block of the current prediction unit.

Figure 4:
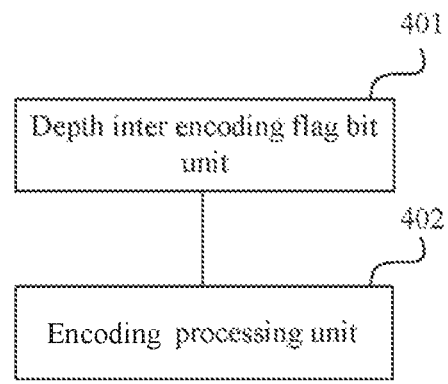
FIG. 4 is a second structure diagram of an encoder according to an embodiment of the invention.

FIG. 4 is a second structure diagram of an encoder according to an embodiment of the invention; comprising:

a depth inter encoding flag bit unit 401, adapted to set a depth inter encoding flag bit in an encoding area;

an encoding processing unit 402, adapted to judge whether the depth inter encoding flag bit is true, and judge whether a depth picture inter encoding mode is a skip mode if it is judged that the depth inter encoding flag bit is true; set a first depth picture inter encoding flag bit to an encoding unit if it is judged that the depth picture inter encoding mode is not the skip mode; and judge whether the first depth picture inter encoding flag bit is true; encode merely one residual value to each prediction unit if it is judged that the first depth picture inter encoding flag bit is true.

Particularly, the encoding processing unit 402 is further adapted to encode by adopting a residual encoding manner existing in 3D-HEVC so that the first depth picture inter encoding flag bit to the encoding unit is not set if it is judged that the depth inter encoding flag bit is false.

Particularly, the encoding area is an entire sequence, at least one group of pictures, at least one picture or at least one strip.

Particularly, the depth inter encoding flag bit is set in at least one of a sequence parameter set, a video parameter set, an picture parameter set and a strip head parameter set.

Particularly, the encoding processing unit is further adapted to:

If it is judged that dividing manner of the encoding unit is 2N×2N, the encoding unit only includes one prediction unit and only encodes 1 residual value; wherein, N is one of 4, 8, 16, 32; or if it is judged that dividing manner of the encoding unit is 2N×N, 2N×nU or 2N×nD, the encoding unit only includes an up and a down prediction units, wherein, n=N/2, U means up, D means down; or if it is judged that dividing manner of the encoding unit is N×2N, nL×2N or nR×2N, the encoding unit only includes a left and a right prediction units and correspondingly encodes two residual values, wherein, n=N/2, L means left, R means right; or if it is judged that dividing manner of the encoding unit is N×N, the encoding unit includes four prediction units and correspondingly encodes four residual values.

Particularly, the encoding processing unit is further adapted to generate the residual value according to the following method: the residual value=a mean value of all pixels in the current prediction unit−a mean value of all pixels in a prediction block of the current prediction unit.

Figure 5:
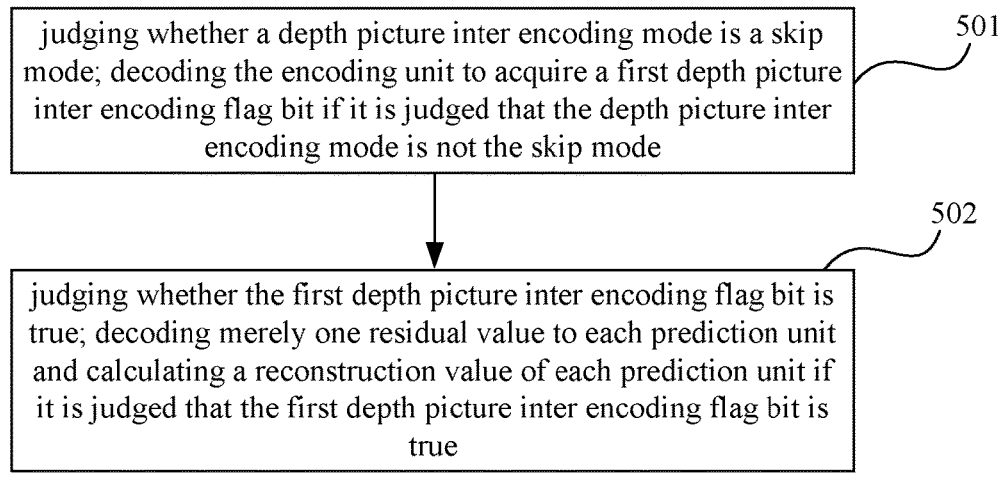
FIG. 5 is a first flowchart of a depth picture inter decoding method according to an embodiment of the invention.

FIG. 5 is a first flowchart of the depth picture inter decoding method according to an embodiment of the invention; comprising:

step 501: judging whether a depth picture inter encoding mode is a skip mode; decoding the encoding unit to acquire a first depth picture inter encoding flag bit if it is judged that the depth picture inter encoding mode is not the skip mode;

step 502: judging whether the first depth picture inter encoding flag bit is true; decoding merely one residual value to each prediction unit and calculating a reconstruction value of each prediction unit if it is judged that the first depth picture inter encoding flag bit is true.

Particularly, the depth picture inter decoding method further comprises: decoding by adopting a residual decoding manner existing in 3D-HEVC if it is judged that the first depth picture inter encoding flag bit is false.

Particularly, the step of decoding merely one residual value to each prediction unit comprises:

If it is judged that dividing manner of the encoding unit is 2N×2N, the encoding unit only includes one prediction unit and only decodes 1 residual value; wherein, N is one of 4, 8, 16, 32; or if it is judged that dividing manner of the encoding unit is 2N×N, 2N×nU or 2N×nD, the encoding unit only includes an up and a down prediction units and correspondingly decodes 2 residual values; wherein, n=N/2, U means up, D means down; or if it is judged that dividing manner of the encoding unit is N×2N, nL×2N or nR×2N, the encoding unit only includes a left and a right prediction units and correspondingly decodes two residual values, wherein, n=N/2, L means left, R means right; or if it is judged that dividing manner of the encoding unit is N×N, the encoding unit includes four prediction units and correspondingly decodes four residual values.

Particularly, method for generating the reconstruction value is: the reconstruction value=a residual value+a value of a prediction block of the current prediction unit.

Figure 6:
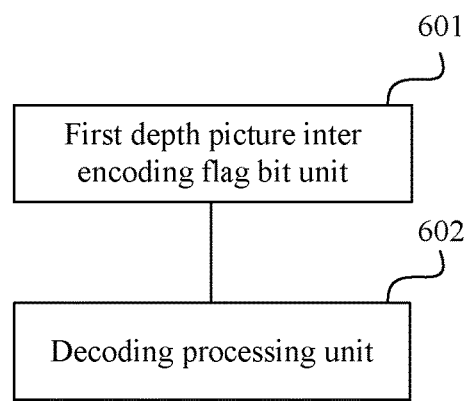
FIG. 6 is a first structure diagram of a decoder according to an embodiment of the invention.

FIG. 6 is a first structure diagram of a decoder according to an embodiment of the invention; comprising:

a first depth picture inter encoding flag bit unit 601, adapted to judge whether a depth picture inter encoding mode is a skip mode; decode the encoding unit to acquire a first depth picture inter encoding flag bit if it is judged that the depth picture inter encoding mode is not the skip mode;

a decoding processing unit 602, adapted to judge whether the first depth picture inter encoding flag bit is true; decode merely one residual value to each prediction unit and calculate a reconstruction value of each prediction unit if it is judged that the first depth picture inter encoding flag bit is true.

Particularly, the decoding processing unit is further adapted to decode by adopting a residual decoding manner existing in 3D-HEVC if it is judged that the first depth picture inter encoding flag bit is false.

Particularly, the decoding processing unit is further adapted to:

If it is judged that dividing manner of the encoding unit is 2N×2N, the encoding unit only includes one prediction unit and only decodes 1 residual value; wherein, N is one of 4, 8, 16, 32; or if it is judged that dividing manner of the encoding unit is 2N×N, 2N×nU or 2N×nD, the encoding unit only includes an up and a down prediction units and correspondingly decodes 2 residual values; wherein, n=N/2, U means up, D means down; or if it is judged that dividing manner of the encoding unit is N×2N, nL×2N or nR×2N, the encoding unit only includes a left and a right prediction units and correspondingly decodes two residual values, wherein, n=N/2, L means left, R means right; or if it is judged that dividing manner of the encoding unit is N×N, the encoding unit includes four prediction units and correspondingly decodes four residual values.

Particularly, the decoding processing unit is further adapted to generate the reconstruction value according to the following method: the reconstruction value=a residual value+a value of a prediction block of the current prediction unit.

Figure 7:
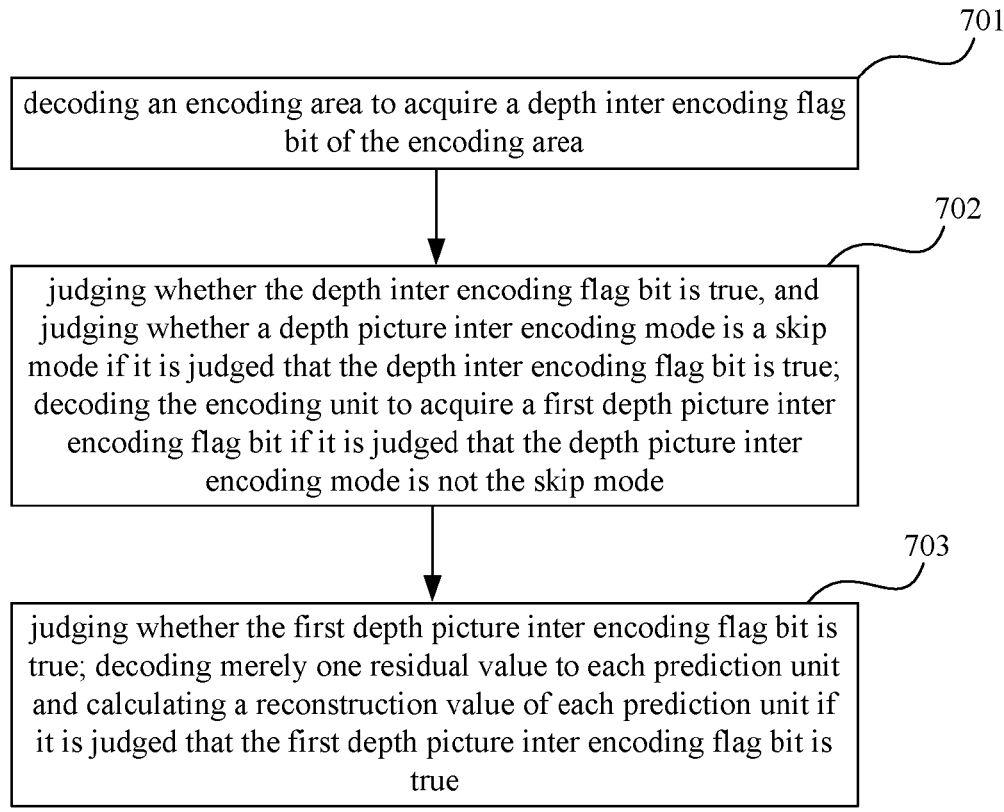
FIG. 7 is a second flowchart of the depth picture inter decoding method according to an embodiment of the invention.

FIG. 7 is a second flowchart of the depth picture inter decoding method according to an embodiment of the invention; comprising:

step 701: decoding an encoding area to acquire a depth inter encoding flag bit of the encoding area;

step 702: judging whether the depth inter encoding flag bit is true, and judging whether a depth picture inter encoding mode is a skip mode if it is judged that the depth inter encoding flag bit is true; decoding the encoding unit to acquire a first depth picture inter encoding flag bit if it is judged that the depth picture inter encoding mode is not the skip mode;

step 703: judging whether the first depth picture inter encoding flag bit is true; decoding merely one residual value to each prediction unit and calculating a reconstruction value of each prediction unit if it is judged that the first depth picture inter encoding flag bit is true.

Particularly, the depth picture inter decoding method further comprises: decoding by adopting a residual decoding manner existing in 3D-HEVC so that an operation to acquire the first depth picture inter encoding flag bit to the encoding unit is not performed if it is judged that the depth inter encoding flag bit is false.

Particularly, the encoding area is an entire sequence, at least one group of pictures, at least one picture or at least one strip.

Particularly, the depth inter encoding flag bit is acquired from at least one of a sequence parameter set, a video parameter set, an picture parameter set and a strip head parameter set.

Particularly, the step of decoding merely one residual value to each prediction unit comprises:

If it is judged that dividing manner of the encoding unit is 2N×2N, the encoding unit only includes one prediction unit and only decodes 1 residual value; wherein, N is one of 4, 8, 16, 32; or if it is judged that dividing manner of the encoding unit is 2N×N, 2N×nU or 2N×nD, the encoding unit only includes an up and a down prediction units and correspondingly decodes 2 residual values; wherein, n=N/2, U means up, D means down; or if it is judged that dividing manner of the encoding unit is N×2N, nL×2N or nR×2N, the encoding unit only includes a left and a right prediction units and correspondingly decodes two residual values, wherein, n=N/2, L means left, R means right; or if it is judged that dividing manner of the encoding unit is N×N, the encoding unit includes four prediction units and correspondingly decodes four residual values.

Particularly, method for generating the reconstruction value is: the reconstruction value=a residual value+a value of a prediction block of the current prediction unit.

Figure 8:
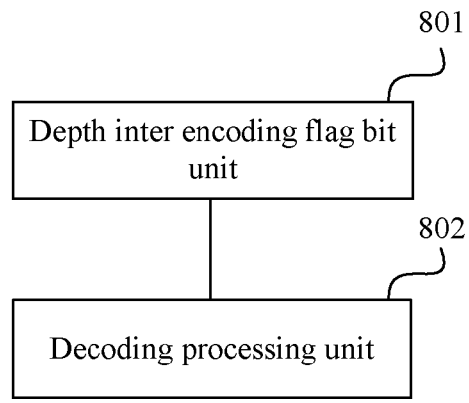
FIG. 8 is a second structure diagram of the decoder according to an embodiment of the invention.
Figure 9:
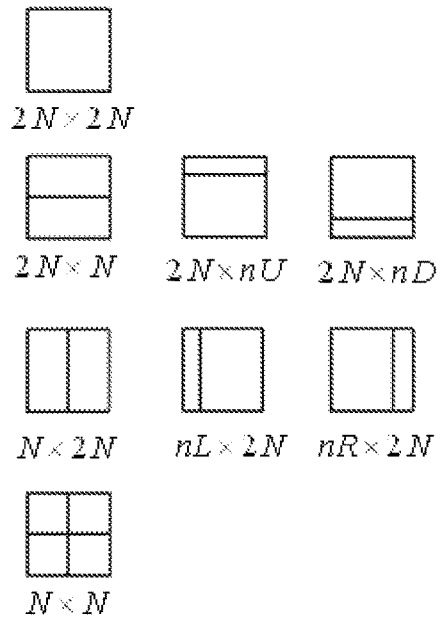
FIG. 9 is a schematic of dividing manner of an inter mode depth encoding unit in 3D-HEVC in prior art.

FIG. 8 is a second structure diagram of an decoder according to an embodiment of the invention; comprising:

a depth inter encoding flag bit unit 801, adapted to decode an encoding area to acquire a depth inter encoding flag bit of the encoding area;

a decoding processing unit 802, adapted to judge whether the depth inter encoding flag bit is true, and judge whether a depth picture inter encoding mode is a skip mode if it is judged that the depth inter encoding flag bit is true; decode the encoding unit to acquire a first depth picture inter encoding flag bit if it is judged that the depth picture inter encoding mode is not the skip mode; and judge whether the first depth picture inter encoding flag bit is true; decode merely one residual value to each prediction unit and calculate a reconstruction value of each prediction unit if it is judged that the first depth picture inter encoding flag bit is true.

Particularly, the decoding processing unit 802 is further adapted to decode by adopting a residual decoding manner existing in 3D-HEVC so that an operation to acquire the first depth picture inter encoding flag bit to the encoding unit is not performed if it is judged that the depth inter encoding flag bit is false.

Particularly, the encoding area is an entire sequence, at least one group of pictures, at least one picture or at least one strip.

Particularly, the depth inter encoding flag bit is acquired from at least one of a sequence parameter set, a video parameter set, an picture parameter set and a strip head parameter set.

Particularly, the decoding processing unit 802 is further adapted to:

If it is judged that dividing manner of the encoding unit is 2N×2N, the encoding unit only includes one prediction unit and only decodes 1 residual value; wherein, N is one of 4, 8, 16, 32; or if it is judged that dividing manner of the encoding unit is 2N×N, 2N×nU or 2N×nD, the encoding unit only includes an up and a down prediction units and correspondingly decodes 2 residual values; wherein, n=N/2, U means up, D means down; or if it is judged that dividing manner of the encoding unit is N×2N, nL×2N or nR×2N, the encoding unit only includes a left and a right prediction units and correspondingly decodes two residual values, wherein, n=N/2, L means left, R means right; or if it is judged that dividing manner of the encoding unit is N×N, the encoding unit includes four prediction units and correspondingly decodes four residual values.

Particularly, the decoding processing unit is further adapted to generate the reconstruction value according to the following method: the reconstruction value=a residual value+a value of a prediction block of the current prediction unit.

Embodiment

As many of the contents of a depth picture are smooth areas spaced by edges, contents in one identical area are very similar, therefore residual signal contents within one identical area are usually similar. In order to save code rate required for encoding/decoding a depth picture, the invention provides that only one residual signal is used for each area. To be specific, only one residual value is encoded/decoded for each prediction unit, so as to not only reduce code rate of the depth picture, but also save transformation operation and reduce complexity of an encoder/decoder. The technical solution is detailed as follows:

1. A Depth Picture Inter Encoding Flag Bit of an Encoding Unit

For each depth encoding unit, setting a first depth picture inter encoding flag bit of an encoding unit for indicating whether a simplified depth picture inter encoding method is adopted if the current encoding unit is an inter encoding mode but not a skip mode. The simplified depth picture inter encoding method is adopted if it is judged that the flag bit is true; otherwise, an encoding method existing in 3D-HEVC is adopted.

2. Simplified Depth Picture Inter Encoding/Decoding Method

Number of residual values required to be encoded/decoded in different dividing cases:

a: 2N×2N the encoding unit only includes one prediction unit, and encodes/decodes only one residual;

b: 2N×N, 2N×nU, or 2N×nD the encoding unit includes an up and a low prediction units, and correspondingly encodes/decodes 2 residual values;

c: N×2N, nL×2N, or nR×2N the encoding unit includes an up and a low prediction units, and correspondingly encodes/decodes two residual values;

d: N×N the encoding unit includes four prediction units, and correspondingly encodes/decodes four residual values;

3. Residual Value

A) Method for Generating a Residual Value at Encoder End

For each prediction unit, there can be many methods for generating the residual value, and one simple generation method is as follows:

the residual value=a mean value of all pixels in the current prediction unit–a mean value of all pixels in a prediction block of the current prediction unit.

B) Encoding and Decoding of the Residual Value

The invention does not perform quantization/dequantization to residual values (can perform quantization/dequantization of course), but encodes/decodes the original residual values directly.

Figure 10:
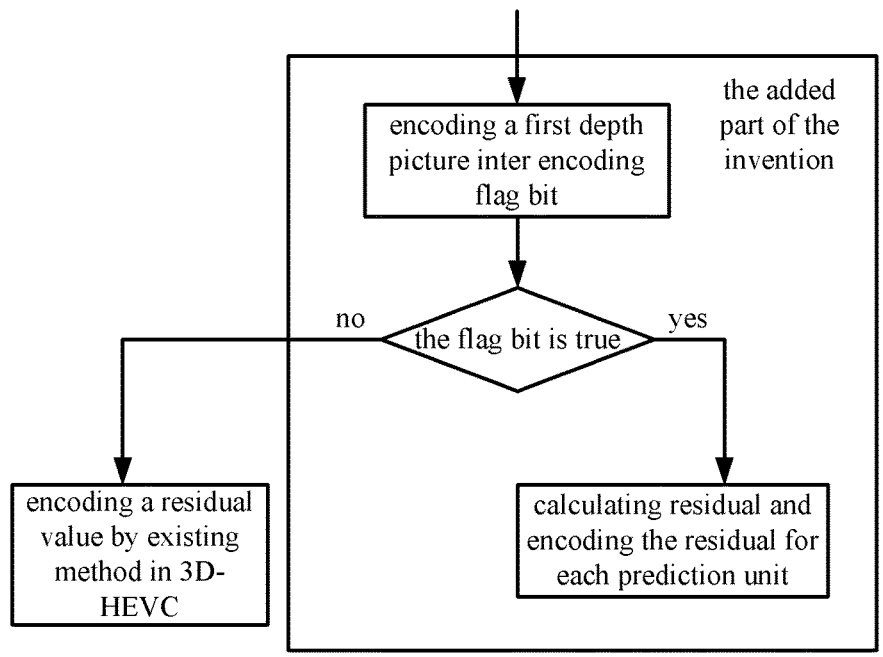
FIG. 10 is a first schematic diagram of improved function of the encoder according to an embodiment of the invention.
Figure 11:
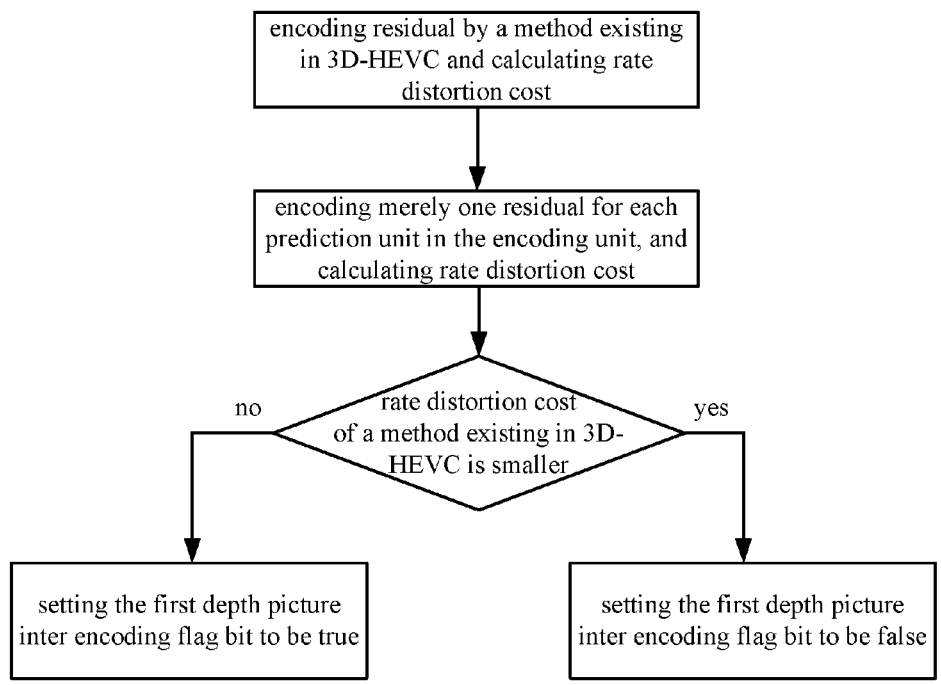
FIG. 11 is a second schematic diagram of improved function of the encoder according to an embodiment of the invention.

FIG. 10 is a first schematic diagram of improved function of the encoder according to an embodiment of the invention. Setting a first depth picture inter encoding flag bit to the encoding unit, and selecting the encoding method by judging the flag bit is true or false. FIG. 11 is a second schematic diagram of improved function of the encoder according to an embodiment of the invention. It can be seen from FIG. 11 that the first depth picture inter encoding flag bit is judged to be true or false according to rate distortion cost. That is, acquiring or calculating a rate distortion cost of an existing residual encoding method in 3D-HEVC and a rate distortion cost of the residual encoding method by which each prediction unit merely encodes only one residual value, judging the first depth picture inter encoding flag bit of a current picture block by comparing sizes of the two rate distortion costs.

Figure 12:
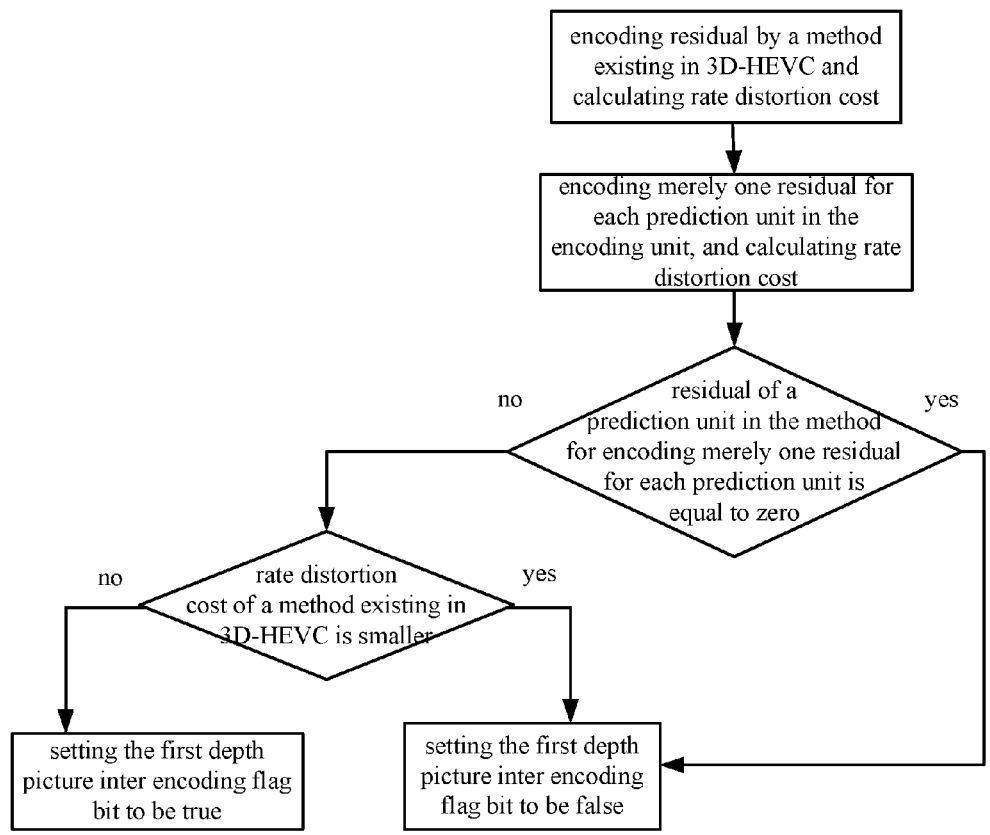
FIG. 12 is a third schematic diagram of improved function of the encoder according to an embodiment of the invention.

The rate distortion cost is adopted for selecting an optimum method, besides, on basis of this, other conditions can be added, as shown in FIG. 12 which is a third schematic diagram of improved function of the encoder according to an embodiment of the invention.

Firstly, acquiring or calculating rate distortion cost of the residual encoding manner existing in 3D-HEVC;

then, acquiring or calculating rate distortion cost by which merely one residual value is encoded to each prediction unit;

Finally, judging whether at least one of the residual values of the prediction unit in the encoding unit is zero; setting the first depth picture inter encoding flag bit to be false if the above judgment is true; otherwise, setting the first depth picture inter encoding flag bit by comparing the rate distortion cost of the residual encoding manner existing in 3D-HEVC with the rate distortion cost by which merely one residual value is encoded to each prediction unit.

As shown FIG. 12, mandatorily using the residual encoding method in 3D-HEVC if a residual value of a prediction unit is equal to zero.

In FIGS. 10~12, the condition in which an encoding method is selected by judging whether the first depth picture inter encoding flag bit is true or false can reduce overlap of "method by which each prediction unit only encodes one residual" and the skip mode in 3D-HEVC, so as to further reduce code rate.

Figure 13:
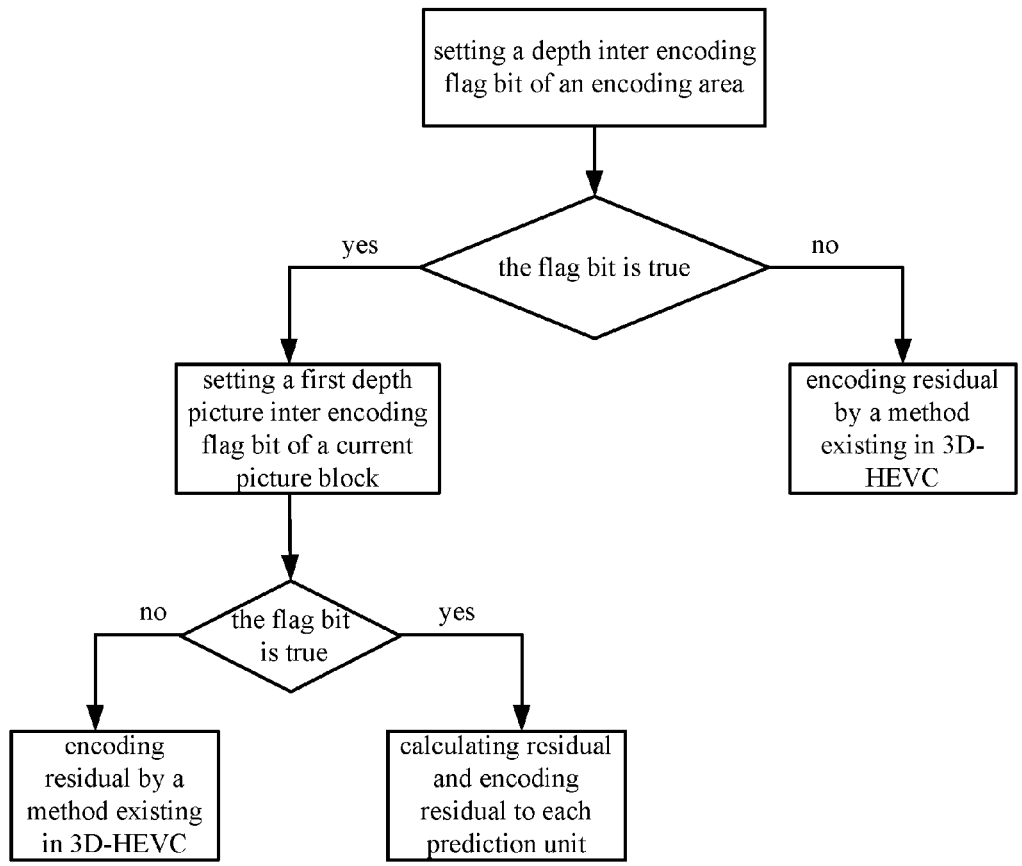
FIG. 13 is a fourth schematic diagram of improved function of the encoder according to an embodiment of the invention.

FIG. 13 is a fourth schematic diagram of improved function of the encoder according to an embodiment of the invention. On the basis of FIGS. 10-11, it is also practicable to set a depth inter encoding flag bit to an encoding area above the level of the encoding unit for convenience of using/forbidding "method by which each prediction unit only encodes one residual". It is allowed for an encoding unit in the encoding area to use "method by which each prediction unit only encodes one residual" and set a first depth picture inter encoding flag bit for the current picture block to indicate which method is adopted to encode the residual when the depth inter encoding flag bit of an encoding area above the level of the encoding unit is judged to be "true"; all encoding units in the encoding area adopt the residual encoding method in 3D-HEVC so that the first depth picture inter encoding flag bit is not set to the current picture block when the depth inter encoding flag bit of an encoding area above the level of the encoding unit is judged to be "false".

The encoding area can be an entire sequence, a group of pictures, an picture or a strip, and correspondingly the encoding area depth inter encoding flag bit can be added into at least one of a sequence parameter set, a video parameter set, an picture parameter set and a strip parameter set.

After a higher level of flag bit is introduced, the method can be forbidden at a higher level when "method by which each prediction unit only encodes one residual value" can not improve an picture compression ratio, so that there is no need to encode a flag bit for each encoding unit, to reduce code rate required for the encoding flag bit. A higher level of flag bit is also flexible, for example, when the encoder has a strong calculation capability, "method by which each prediction unit only encodes one residual" can be used, otherwise this method is forbidden.

Figure 14:
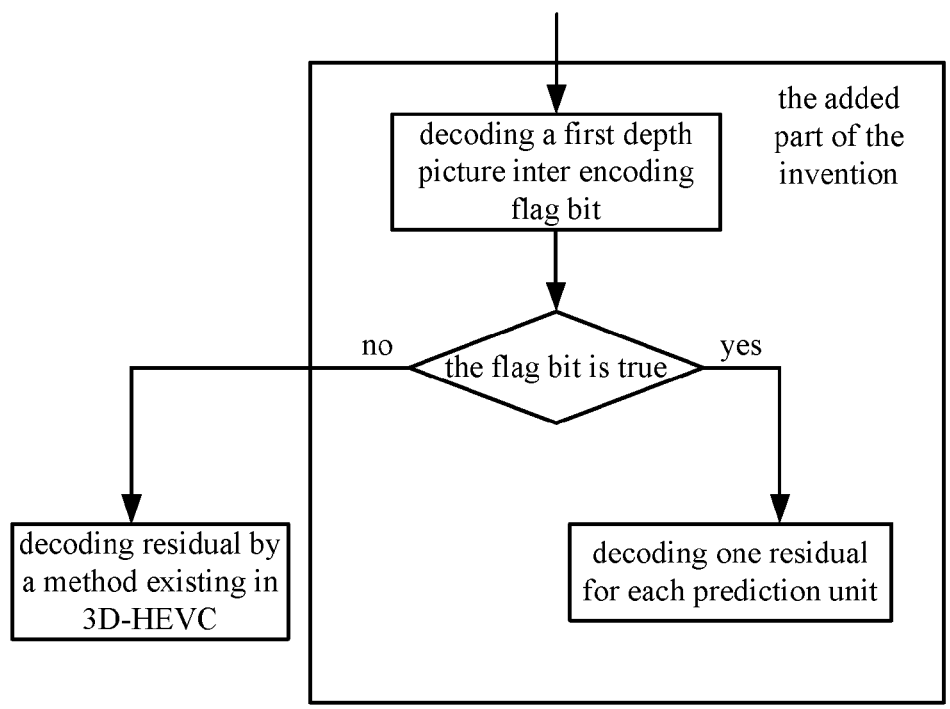
FIG. 14 is a first schematic diagram of improved function of the decoder according to an embodiment of the invention.

Similarly, FIG. 14 is a first schematic diagram of improved function of the encoder according to an embodiment of the invention. The decoder is similar to FIGS. 10~13, merely an output result of the encoding unit is decoded to acquire the first depth picture inter encoding flag bit and/or the depth inter encoding flag bit of the encoding area, to select a corresponding appropriate decoding method by judging whether the flag bit is true or false.

Experiment Result

The invention is integrated onto an HTM-6.0 (HTM: 3D High efficiency video coding Test Model) to conduct testing. An experiment result shows that the invention can averagely improve encoding efficiency to −0.57% under a general testing condition.

The experiment result of the embodiment of the invention is shown in the following Table 1. Totally seven standard test sequences are tested, including a sequence with resolution ratio to be 1024×768: Balloons, kendo, and Newspaper_CC; and a sequence with resolution ratio to be 1920×1088: GT_Fly, Poznan_Hall2, Poznan_Street and Undo_Dancer. These testing sequences all include videos of three viewing angles and corresponding depth information of three viewing angles. In order to measure encoding performance of the depth picture, Table 1 lists variations of a compound viewpoint peak value signal-to-noise ratio relative to a general code rate (as the depth picture is not used for being watched directly but for compounding a virtual viewpoint, the compression effect of the depth picture is measured by a peak value signal-to-noise ratio of the compound viewpoint). In the list, −x.x % denotes that the compression ratio is improved by x.x %, and x.x % denotes that the compression ratio is reduced by x.x %. It can be seen that the invention can improve the compression ratio by 0.57%.

TABLE 1

| | Compound sequence peak value signal-to-noise ratio/general code rate |
|---|---|
| Balloons | −0.35% |
| kendo | −0.26% |
| Newspaper_CC | −0.34% |
| CT_Fly | −0.76% |
| Poznan_Hall2 | −1.20% |
| Poznan_Street | −0.16% |
| Undo_Dancer | −0.92% |
| Average value | −0.57% |

Objectives, technical solutions and beneficial effects of the invention are further described in detail in the above mentioned specific embodiment. It should be understood that the above are merely specific embodiments of the invention, are not used for limiting protection scope of the invention. Any modifications, equivalent replacements, improvements and the like which are made within spirit and principle of the invention should be included within protection scope of the invention.

The invention claimed is:

1. A depth picture inter encoding method, comprising:
setting a depth inter encoding flag bit in an encoding area, characterized in that the encoding area is an entire sequence, at least one group of pictures, at least one picture or at least one strip, and further characterized in that the depth inter encoding flag bit of the encoding area is set in at least one of a sequence parameter set, a video parameter set, a picture parameter set and strip head parameter set;
judging whether the depth inter encoding flag bit is true, and judging whether a depth picture inter encoding mode is a skip mode if it is judged that the depth inter encoding flag bit is true; setting a first depth picture inter encoding flag bit to an encoding unit if it is judged that the depth picture inter encoding mode is not the skip mode;
judging whether the first depth picture inter encoding flag bit is true; if it is judged that the first depth picture inter encoding flag bit is true, determining a number of prediction units according to a dividing manner of the encoding unit, and encoding merely one residual value to each prediction unit;

the encoding of merely one residual value to each prediction unit comprises:

if it is judged that dividing manner of the encoding unit is 2N×2N, the encoding unit only includes one prediction unit and only encodes 1 residual value; wherein, N is one of 4, 8, 16, 32; or if it is judged that dividing manner of the encoding unit is 2N×N, 2N×nU or 2N×nD, the encoding unit only includes an up and a down prediction units, wherein, n=N/2, U means up, D means down; or if it judged that dividing manner of the encoding unit is N×2N, nL×2N or nR×2N, the encoding unit only includes a left and a right prediction units and correspondingly encodes two residual values, wherein, n=N/2, L means left, R means right; or if it is judged that dividing manner of the encoding unit is N×N, the encoding unit includes four prediction units and correspondingly encodes four residual values.

2. The depth picture inter encoding method according to claim 1, characterized in that the depth picture inter encoding method further comprises: encoding by adopting a residual encoding manner existing in 3D-HEVC if it is judged that the first depth picture inter encoding flag bit is false.

3. The depth picture inter encoding method according to claim 1, characterized in that the setting of the first depth picture inter encoding flag bit to the encoding unit comprises:

acquiring or calculating rate distortion cost of the residual encoding manner existing in 3D-HEVC; acquiring or calculating rate distortion cost by which merely one residual value is encoded to each prediction unit; setting the first depth picture inter encoding flag bit by comparing the rate distortion cost of the residual encoding manner existing in 3D-HEVC with the rate distortion cost by which merely one residual value is encoded to each prediction unit; or acquiring or calculating rate distortion cost of the residual encoding manner existing in 3D-HEVC; acquiring or calculating rate distortion cost by which merely one residual value is encoded to each prediction unit; judging whether at least one of the residual values of the prediction unit in the encoding unit is zero; setting the first depth picture inter encoding flag bit to be false if the above judgment is true; otherwise, setting the first depth picture inter encoding flag bit by comparing the rate distortion cost of the residual encoding manner existing in 3D-HEVC with the rates distortion cost by which merely one residual value is encoded to each prediction unit.

4. The depth picture inter encoding method according to claim 3, characterized in that the setting of the first depth picture inter encoding flag bit by comparing the rate distortion cost of the residual encoding manner existing in 3D-HEVC with the rate distortion cost by which merely one residual value is encoded to each prediction unit comprises:

setting the first depth picture inter encoding flag bit to be true if the rate distortion cost of the residual encoding manner existing in the 3D-HEVC is higher than the rate distortion cost by which merely one residual value is encoded to each prediction unit; otherwise, setting the first depth picture inter encoding flag bit to be false.

5. The depth picture inter encoding method according to claim 1, characterized in that method for generating the residual value comprises: the residual value=a mean value of all pixels in the current prediction unit−a mean value of all pixels in a prediction block of the current prediction unit.

6. A depth picture inter decoding method, comprising:

decoding an encoding area to acquire a depth inter encoding flag bit of the encoding area, characterized in that the encoding area is an entire sequence, at least one group of pictures, at least one picture or at least one strip, and further characterized in that the depth inter encoding flag bit of the encoding area is acquired from at least one of a sequence parameter set, a video parameter set, a picture parameter set and a strip head parameter set;

judging whether the depth inter encoding flag bit is true, and judging whether a depth picture inter encoding mode is a skip mode if it is judged that the depth inter encoding flag bit is true; decoding an encoding unit to acquire a first depth picture inter encoding flag bit if it is judged that the depth picture inter encoding mode is not the skip mode;

judging whether the first depth picture inter encoding flag bit is true; if it is judged that the first depth picture inter encoding flag bit is true, determining a number of prediction units according to a dividing manner of the encoding unit, decoding merely one residual value to each prediction unit and calculating a reconstruction value of each prediction unit;

the decoding of merely one residual value to each prediction unit comprises:

if it is judged that dividing manner of the encoding unit is 2N×2N, the encoding unit only includes one prediction unit and only decodes 1 residual value; wherein, N is one of 4, 8, 16, 32; or if it is judged that dividing manner of the encoding unit is 2N×N, 2N×nU or 2N×nD, the encoding unit only includes an up and a down prediction units and correspondingly decodes 2 residual values; wherein, n=N/2, U means up, D means down; or if it is judged that dividing manner of the encoding unit is N×2N, nL×2N or nR×2N, the encoding unit only includes a left and a right prediction units and correspondingly decodes two residual values, wherein, n=N/2, L means left, R means right; or if it is judged that dividing manner of the encoding unit is N×N, the encoding unit includes four prediction units and correspondingly decodes four residual values.

7. The depth picture inter decoding method according to claim 6, characterized in that the depth picture inter decoding method further comprises: decoding by adopting a residual decoding manner existing in 3D-HEVC so that an operation to acquire the first depth picture inter encoding flag bit to the encoding unit is not performed if it is judged that the depth inter encoding flag bit is false.

8. The depth picture inter decoding method according to claim 6, characterized in that method for generating the reconstruction value is: the reconstruction value=a residual value+a value of a prediction block of the current prediction unit.

* * * * *

UNITED STATES PATENT AND TRADEMARK OFFICE
CERTIFICATE OF CORRECTION

PATENT NO. : 10,148,935 B2  
APPLICATION NO. : 14/783720  
DATED : December 4, 2018  
INVENTOR(S) : Hongbin Liu and Jie Jia Page 1 of 1

It is certified that error appears in the above-identified patent and that said Letters Patent is hereby corrected as shown below:

In the Claims

Column 13, Line 48 Claim 3: Replace the word "rates" with "rate"

Signed and Sealed this  
Fourteenth Day of May, 2019

Andrei Iancu  
*Director of the United States Patent and Trademark Office*